(12) United States Patent
Schmitt et al.

(10) Patent No.: US 10,093,163 B2
(45) Date of Patent: Oct. 9, 2018

(54) DRIVE MODULE FOR A DRIVE TRAIN OF A HYBRID VEHICLE

(71) Applicant: ZF Friedrichshafen AG

(72) Inventors: Guido Schmitt, Oerlenbach (DE); Sven Ludsteck, Muennerstadt (DE); Florian Model, Eltmann (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/230,669

(22) Filed: Aug. 8, 2016

(65) Prior Publication Data

US 2017/0043657 A1    Feb. 16, 2017

(30) Foreign Application Priority Data

Aug. 13, 2015   (DE) .......................... 10 2015 215 447

(51) Int. Cl.
*B60K 6/40*    (2007.10)
*B60K 6/48*    (2007.10)
*F16D 25/12*    (2006.01)
*F16D 13/75*    (2006.01)
(Continued)

(52) U.S. Cl.
CPC .................. *B60K 6/40* (2013.01); *B60K 6/48* (2013.01); *F16D 25/087* (2013.01); *F16D 25/126* (2013.01); *B60K 2006/4825* (2013.01); *B60Y 2200/92* (2013.01); *B60Y 2400/424* (2013.01); *F16D 13/38* (2013.01); *F16D 13/75* (2013.01); *F16D 2300/12* (2013.01);
(Continued)

(58) Field of Classification Search
CPC ...... F16D 25/087; F16D 25/126; F16D 13/38; F16D 13/44; F16D 13/75; F16D 2300/12; B60K 6/40; B60K 6/48; B60K 6/387
See application file for complete search history.

(56) References Cited

U.S. PATENT DOCUMENTS 5,918,987 A * 7/1999 Sundquist ............... F16C 19/30
                                                                        384/618
6,561,336 B1 * 5/2003 Huart ...................... F02B 63/04
                                                                        123/179.28
(Continued)

FOREIGN PATENT DOCUMENTS

DE    102006056512    6/2008
EP    2148107    1/2010

*Primary Examiner* — Ramya P Burgess
*Assistant Examiner* — David R Morris
(74) *Attorney, Agent, or Firm* — Cozen O'Connor

(57) ABSTRACT

A drive module for a powertrain of a hybrid vehicle and a method for assembling the drive module for the powertrain of the hybrid vehicle, having a housing, a friction clutch with a pressure plate which is axially displaceable by means of an actuating arrangement, a clutch plate and with a clutch disk arrangement positioned therebetween, a hub, wherein this hub is fixedly connected to the clutch disk arrangement, and an electric machine which has a rotor with a rotor carrier and a stator which is fixed at a stator carrier. The axial arrangement or alignment of the clutch disk arrangement relative to the pressure plate and clutch plate is determined by an adjusting arrangement, wherein the adjusting arrangement is functionally arranged between the hub and a supporting element which is axially fixed to the housing of the drive module.

8 Claims, 2 Drawing Sheets

(51) Int. Cl.
    *F16D 25/08* (2006.01)
    *F16D 13/38* (2006.01)
(52) U.S. Cl.
    CPC ........ *Y02T 10/6221* (2013.01); *Y02T 10/6252* (2013.01); *Y10S 903/914* (2013.01)

(56) References Cited

U.S. PATENT DOCUMENTS

| | | | | |
|---|---|---|---|---|
| 8,267,208 | B2 * | 9/2012 | Kleuker | B60K 6/40 180/65.22 |
| 9,108,637 | B2 * | 8/2015 | Ruder | B60K 6/383 |
| 2006/0289209 | A1 * | 12/2006 | Grosspietsch | B60K 6/26 180/65.25 |
| 2008/0113846 | A1 * | 5/2008 | Wiggen | B60K 6/26 477/3 |
| 2010/0187028 | A1 | 7/2010 | Kleuker | |

* cited by examiner

DRIVE MODULE FOR A DRIVE TRAIN OF A HYBRID VEHICLE

BACKGROUND OF THE INVENTION

1. Field of the Invention

The invention is directed to a module for a powertrain of a hybrid vehicle and to a method for assembling a hybrid module of this type.

2. Description of the Related Art

A drive unit for a hybrid vehicle is shown in EP 2 148 107 A1. A clutch disk arrangement has an axially elastic region which allows an axial movement of the friction linings when closing the associated friction clutch relative to a hub. In particular, a lifting of the friction linings from the clutch plate and pressure plate is achieved when the internal combustion engine is switched off. In so doing, a correct axial alignment of the clutch disk arrangement relative to the pressure plate and clutch plate is necessary when the friction clutch is open in order to achieve a correct air gap between the pressure plate and clutch plate relative to the friction linings with the clutch open. A hub of the drive unit is fixedly connected, particularly axially fixedly connected, to the crankshaft of the associated internal combustion engine. An alignment is carried out via an adjusting disk which is arranged between the clutch disk arrangement and the hub. In this respect, an alignment of the clutch disk arrangement can be carried out only after the drive unit has been completely installed in the vehicle and particularly at the internal combustion engine.

Therefore, an object is to provide a drive module in which an alignment or axial arrangement of the clutch arrangement within the friction clutch can be carried out already in a preassembly of the drive module.

SUMMARY OF THE INVENTION

The present invention provides a drive module for a powertrain of a hybrid vehicle that has a housing which is fixedly connected to an internal combustion engine, particularly to the housing thereof, in an installed condition of the drive module in a vehicle. The drive module has a friction clutch. The friction clutch comprises an actuating arrangement, an axially movable pressure plate which can be actuated via the actuating arrangement, a clutch plate which is axially stationary relative to the housing of the drive module, and a clutch disk arrangement. The clutch disk arrangement, particularly the friction linings thereof, is arranged axially between the clutch plate and pressure plate. In the opened state of the friction clutch, there should be an axial air gap between the friction linings of the clutch disk arrangement and the clutch plate and an axial air gap between the friction linings of the clutch disk arrangement and the pressure plate. The air gap preferably corresponds to approximately one half of the release path of the pressure plate. In this respect, the clutch disk has an axially elastic region which allows an axial displacement of the friction linings during the closing of the friction clutch. Correspondingly, the friction linings are displaced in axial direction toward the clutch plate.

The drive module further has a hub which is fixedly connected to the clutch disk arrangement. The friction linings also displace along an axial direction relative to the hub over the axially elastic region during the closing of the friction clutch. Advantageously, the hub is supported in an axially floating manner relative to the crankshaft of the internal combustion engine so that no axial stresses can arise when assembling the internal combustion engine and drive module. The hub of the drive module can be connected to the crankshaft of an internal combustion engine, for example, via a spline. Likewise, the hub of the drive module can also produce a connection to a dual-mass flywheel or to another component for the powertrain.

The drive module further comprises an electric machine having a rotor and a stator. The stator is arranged at a stator carrier which is preferably fixedly connected to the housing of the drive module. Correspondingly, the rotor is arranged at a rotor carrier. The rotor carrier is operatively connected to the housing and to the stator via a bearing arrangement, for example, a rolling element bearing or ball bearing, so that the rotor can rotate freely relative to the stator.

Further, the hub is advantageously arranged in a freely rotating manner relative to the housing, stator and rotor via a further bearing arrangement, for example, a rolling element bearing, a plain bearing or a needle bearing. The bearing arrangement can be arranged, for example, between the hub on one side and a supporting arrangement, the housing, stator carrier and/or rotor carrier on the other side.

The axial arrangement or alignment of the clutch disk arrangement relative to the pressure plate and clutch plate is determined by an adjusting arrangement, and the adjusting arrangement is functionally arranged between the hub and a supporting element which is axially fixedly connected to the housing of the drive module.

By the adjusting arrangement, an alignment of the clutch disk arrangement, particularly of the friction linings of the clutch disk arrangement, can be adjusted already at the preassembled drive module. The module can then be installed in the vehicle without additional labor and is correspondingly immediately ready for use. The supporting element is preferably fixed axially with respect to the housing and is arranged so as to be substantially nondisplaceable relative to the latter, and the supporting element can also be fixedly connected to the housing if required. Correspondingly, the housing and the clutch plate and the housing and the clutch disk are axially fixed with respect to one another, in particular they are arranged so as to be nondisplaceable axially relative to one another, and the clutch disk arrangement is axially aligned with respect to the friction clutch.

In a particularly advantageous manner, the supporting element which is axially fixed with respect to the housing and possibly fixedly connected to the housing is formed by the housing of the drive module itself, by the stator carrier or by the rotor carrier.

Further, the stator carrier and the rotor carrier are preferably connected to the housing substantially so as to be axially fixed or axially nondisplaceable.

In a further constructional variant, the adjusting arrangement is connected to the hub and/or supporting element directly or indirectly, i.e., with or without further intermediate elements.

It has proven advantageous to arrange the adjusting arrangement at an axial end region of the rotor carrier. Accordingly, additional machining steps of the rotor carrier can be omitted. The rotor carrier is advantageously formed so as to be U-shaped in axial cross section.

It is suggested that the adjusting arrangement comprises a first retaining element, an adjusting element and a second retaining element.

The first retaining element, which is preferably constructed as a retaining ring, is advantageously arranged at the hub and advantageously engages in a groove encircling the hub. The second retaining element, which is preferably formed as a thrust washer, is advantageously arranged at the supporting element, preferably at the rotor carrier. The adjusting element, preferably formed as adjusting disk, is preferably arranged axially between the first retaining element and the second retaining element. The hub can be supported axially relative to the rotor carrier via the adjusting arrangement. The adjusting arrangement is advantageously formed in such a way that it supports an axial force on the hub in closing direction of the clutch disk, particularly the pressure plate. In particular, this supports or inhibits an axial movement of the hub in closing direction of the pressure plate.

In further constructional variants, the adjusting arrangement can also have further components. The second retaining element can be constructed as a retaining ring, for example, which engages in a groove of the supporting element. In this embodiment form of the drive module, a further element serving as thrust washer may be required.

The second retaining element advantageously forms a thrust washer and is formed as a plastic part.

It is inexpensive to form the second retaining element as a thrust washer and from plastic. Further, the wear on the second retaining element is relatively minor because a relative rotation under load between the supporting element and the hub occurs only when opening and closing the friction clutch. This is the case at least when the supporting element is formed by the rotor carrier.

It is advantageous when the second retaining element has a collar so as to be radially secured relative to the supporting element, particularly the rotor carrier.

It is advantageous when the axial arrangement or alignment of the clutch disk arrangement relative to the clutch plate and pressure plate is fixed through the thickness of the adjusting disk.

Further, as has already been mentioned, it is suggested that the hub has a spline for connecting to a further drive module.

Accordingly, the hub is supported in an axially freely floating manner relative to a further shaft so that no axial forces are applied to the hub. In this way, wear on the adjusting arrangement is substantially reduced and the drive module is not loaded by forces introduced externally.

In a further constructional variant, the hub is supported relative to the supporting element, particularly the rotor carrier, via a bearing arrangement.

Accordingly, the drive module is stably constructed and the various rotating components are optimally arranged with respect to one another and fixed against one another.

Further, a method is provided for assembling a drive module according to at least one of the preceding constructions.

First, the rotor carrier, the friction clutch, the clutch disk arrangement and the hub are assembled to form a preassembly. In this preassembly, the friction clutch is closed and the clutch disk arrangement contacts the clutch plate. The friction clutch is in a closed state, for example, owing to the spring element of the friction clutch, for example, a diaphragm spring. Correspondingly, the clutch plate and the pressure plate contact the friction linings of the clutch disk arrangement. The hub is centered at the supporting element, advantageously the rotor carrier, relative to the further components via the bearing arrangement, for example. The axially elastic element of the clutch disk arrangement is free from axial forces in this state.

In this state, a distance between a first characteristic measurement point of the supporting element and a second characteristic measurement point of the hub is determined.

The first characteristic measurement point can correspond, for example, to the support surface of a thrust washer which in this case is arranged at the supporting element. The second characteristic measurement point can correspond to a groove of the hub for the first retaining element, for example. Based on this distance, the correct thickness can be determined for the adjusting element so that the air gap between the respective friction lining and the clutch plate and pressure plate is correctly adjusted. The air gap preferably corresponds approximately to one half of the release path of the pressure plate.

Subsequently, the adjusting arrangement, for example, with adjusting element and first retaining element and second retaining element, is assembled, whereupon the rest of the components are arranged at the preassembly. These components can also be assembled already in another preassembly.

BRIEF DESCRIPTION OF THE DRAWINGS

The drive module according to the invention and the method of assembling a drive module of this type will be further described by way of example in the following referring to the accompanying drawings. The drawings show.

DETAILED DESCRIPTION OF THE PRESENTLY PREFERRED EMBODIMENTS

Figure 1:
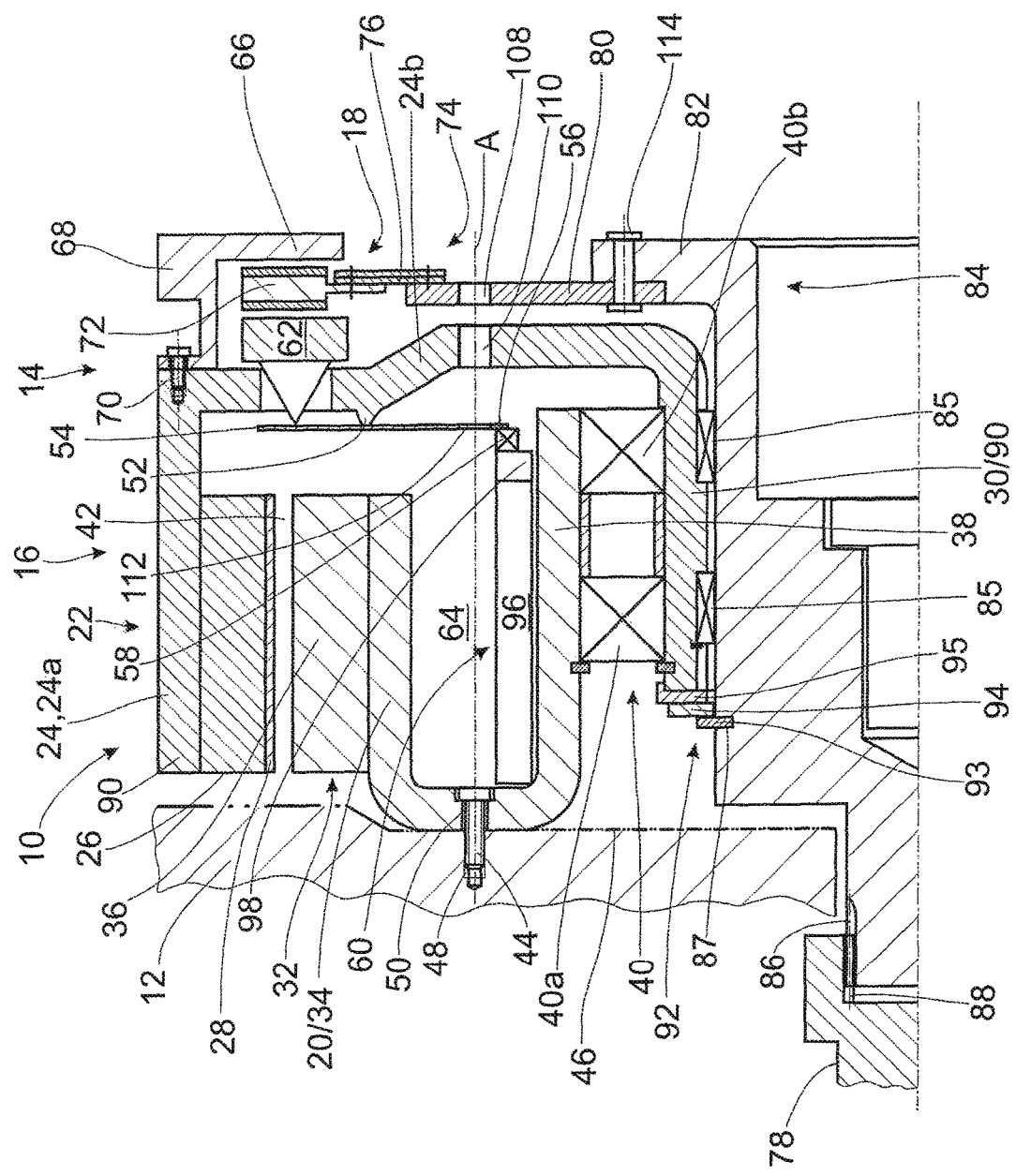
FIG. 1 a drive module shown schematically.

FIG. 1 schematically shows an axial section of a powertrain 10 for a hybrid vehicle comprising an internal combustion engine 12 and a drive module 14, particularly a hybrid module 14, which comprises an electric machine 16 and a shift clutch 18 which is constructed as a friction clutch. A torsion damping device, for example, a dual-mass flywheel, can be arranged between the internal combustion engine 12 and the drive module.

In the present embodiment example, the electric machine 16 is constructed as an external rotor-type permanent magnet synchronous machine and comprises a pot-shaped rotor 22 which revolves around an axis of rotation A and which has a rotor carrier 24 which carries at the inner circumferential surface of its radially outer region a rotor lamination stack 26 with permanent magnets 28 and which forms, or is connected to, a rotor shaft 30 in the radially inner region. The electric machine 16 further comprises a stator 32 with a stator carrier 34, a stator lamination stack 36 with a stator winding, not shown, being arranged in a manner known per se at the outer circumferential surface of the stator carrier 34. To dissipate heat losses of the electric machine 16, the stator carrier 34 can further have a cooling arrangement, particularly a liquid cooling arrangement, which is preferably constructed with the cooling circuit of the internal combustion engine 12.

As an alternative to the external rotor shown in the drawings, the electric machine 16 can also be formed as internal rotor and can also work according to another principle of electrical operation.

The rotor shaft 30 which is constructed as a hollow shaft engages axially in the central recess of a tubular bearing carrier 38 and is radially and axially supported at the latter.

In FIG. 1, the bearing carrier 38 is constructed in one piece with the stator carrier 34. A bearing arrangement 40 is provided at the bearing carrier 38 for receiving the rotor 22, this bearing arrangement 40 comprising in particular a double-row rolling element bearing or two axially spaced rolling element bearings 40*a*; 40*b* so that the rotor 22 is supported relative to the stator 32 in an operationally reliable manner accompanied by the forming of a radial gap 42 which is constant in circumferential direction. Alternatively, the bearing carrier 38 can also be constructed so as to be separate from the stator carrier 34 and fixed at least indirectly at the internal combustion engine 12 independently from the stator carrier 34.

The electric machine 16 is fixed by a plurality of screw bolts 44 in threaded bore holes 48 provided in an engine housing 46 of the internal combustion engine 12. For this purpose, a plurality of corresponding through-apertures 50 are formed at the stator carrier 34 so as to be distributed along the circumference. The stator carrier 34 can possibly also be arranged in a positive engagement and frictional engagement, for example, shrunk on, at the engine housing 46 of the internal combustion engine 12. In this case, the drive module 14 likewise has a drive module housing 20 (hereinafter, housing 20) which is formed in this schematic constructional variant by the stator carrier 34. The housing 20 can also be formed by an independent element, the stator carrier 34 being correspondingly fixedly arranged at the housing 20 of the drive module 14.

It can be seen in FIG. 1 that the rotor carrier 24 comprises an axial carrying portion 24*a* and a radial carrying portion 24*b*, the latter simultaneously forming part of the clutch 18. To this end, a diaphragm spring 54 serving as releasing member 54 is swivelably supported at the latter by a knife edge or fulcrum 52 extending circularly in circumferential direction, which diaphragm spring 54 with its radially inner diaphragm spring tongues 56 is operatively connected via a release bearing 58 with an actuating mechanism 60 of known construction and with the radially outer region with a knife-shaped contact region of a pressure plate 62. The actuating device 60 which is preferably constructed as a hydraulically or pneumatically operating central release mechanism is arranged in an annular receiving space 64 extending radially between the bearing carrier 38 and the stator carrier 34 and can be supported at the bearing carrier 38 during the actuation of the friction clutch 18. The friction clutch 18 further comprises a clutch plate 66 which is axially adjacent to the pressure plate 62 and which is constructed in this instance in a constructional unit with a clutch housing 68 which is connected to the rotor carrier 24 via a detachable connection with screw bolts 70 or, alternatively, with a quarter-turn fastener, for example. When a screw connection is implemented, this screw connection can also be realized as a helical fitting rather than as the axial fitting shown in the drawing.

A friction lining disk 72 which has friction linings on both sides and forms a component part of a clutch disk arrangement 74 is positioned axially between the pressure plate 62 and the clutch plate 66. To this end, the friction lining disk 72 is connected, preferably by riveting, to an axially elastically constructed axially elastic region 76 which is fashioned from spring steel sheet and by means of which the friction lining disk 72 can be slightly axially displaced relative to the driver disk 80 when closing the clutch 18 and which can elastically deform when there occurs an offset of the crankshaft 78 of the internal combustion engine 12 and rotor shaft 30 and a force effect resulting therefrom. The axially elastic region 76 is turn connected, likewise preferably by riveting, to a driver disk 80 which is fixedly connected, for example, via fastening means 114, particularly rivets 114, in a radially inner region to a radial flange 82 of a hub 84 which is formed so as to be hollow. The driver disk 80 and the hub 84 can also be formed in one part. Insofar as region 76 is omitted, the friction lining disk 72 can also be connected directly to a driver disk 80 which is elastic to a limited extent.

The hub 84 is provided with a toothing 86 at the end directed toward the crankshaft 78, which toothing 86 engages in a corresponding toothing 88 of the crankshaft 78. The toothing is a spline in the present case. The hub 84 of the drive module 14 and the crankshaft 78 of the internal combustion engine 12 are supported relative to one another so as to be axially floating. The clutch disk arrangement 74 accordingly comprises the friction lining disk 72, the axially elastic region 76 and the driver disk 80. The drive module 14 can also be connected via hub 84 to a component part other than the crankshaft 78 of the internal combustion engine, for example, a dual-mass flywheel.

To adjust a defined axial position of the friction lining disk 72 relative to the pressure plate 62 and the clutch plate 66, an adjusting arrangement 92 is functionally arranged at the drive module 14 between the hub 84 and the housing 20, particularly a supporting element 90 of the drive module 14. The adjusting arrangement 92 can be arranged directly or indirectly between the hub 84 and the supporting element 90. In this case, the supporting element 90 is formed so as to be axially fixed, or axially fixed in position, relative to the housing 20. In addition, hub 84 is directly supported, and also possibly indirectly supported in other constructional variants, relative to the supporting element 90. The supporting element 90 is formed here by the rotor carrier 24, particularly the rotor shaft 30, hub 84 being supported in radial direction relative to the rotor carrier 24 via bearing arrangements 85, in this case, needle bearing 85. Hub 84 is supported basically directly or indirectly, as it is in this case via rotor carrier 24, in radial direction relative to the housing 20.

Hub 84 can be supported in a direction axially opposite the supporting element 90 via the adjusting arrangement 92. In so doing, the bearing arrangement 85 can be formed so as to be axially displaceable relative to the hub 84 and/or the supporting element 90 or can itself allow an axial displacement. Hub 84 is arranged so as to be substantially axially freely floating relative to the supporting element 90. A minimum distance or lift between the clutch plate 66 and the friction lining disk 72 when the friction clutch is opened is determined by the adjusting arrangement 92. The lift of the pressure plate 62 preferably corresponds to twice the minimum distance between the clutch plate 66 and the friction lining disk 72. Correspondingly, the distance between the pressure plate 62 and the friction lining disk 72 in the opened state of the friction clutch 18 is substantially exactly equal to the minimum distance between the clutch plate 66 and the friction lining disk 72.

The adjusting arrangement 92 comprises a first retaining element 93, an adjusting element 94 and a second retaining element 95 which are arranged substantially axially relative to one another. The first retaining element 93 is formed by a retaining ring 93 which is arranged on the hub side and engages in a groove 87 extending circumferentially around the hub 84. The adjusting element 94 is formed as adjusting disk 94 which encloses hub 84. The second retaining element 95 is arranged on the supporting element side at the supporting element 90, in this case the rotor carrier 24. The second retaining element 95 is formed as thrust washer 95, this thrust washer being formed as a plastic part. The second retaining element 95 with an axially extending collar disposed at the radially outer region thereof is arranged at the supporting element 90.

A relative rotation between the rotor carrier 24 and the hub 84 is compensated by the adjusting arrangement 92 only when the friction clutch 18 is open and during the opening and closing of the friction clutch 18. However, an axial force acts on the thrust washer 95 exclusively during the opening process and closing process of the friction clutch 18 so that this thrust washer 95 has a long service life.

The actuating device 60 comprises a cylinder housing 96, which is axially fixed at the stator carrier 34 or at the bearing carrier 38, and a piston 98 which is axially displaceable relative to the latter in direction of the clutch and which includes the release bearing 58 which swivels the diaphragm spring 54 around its support region or fulcrum 52 when moving out, relieves the pressure plate 62 and displaces it in direction of the internal combustion engine 12 and accordingly opens the clutch 18. The friction lining disk 72 accordingly serves as coupling element between the crankshaft 78 and rotor 22 when the clutch 18 is closed.

Through-apertures 108; 110; 112 are provided in the driver disk 80, in the rotor carrier 24 and in the diaphragm spring 54 for guiding through the screw bolts 44. However, the quantity of through-apertures at each of the elements 80; 24; 54 is less than the quantity of screw bolts 44 to be installed and, therefore, less than the quantity of through-apertures 50 in the stator carrier 34 or bearing carrier 38.

It can be seen from the previous description that a hybrid vehicle outfitted with a drive unit of this kind can be driven, depending upon requirements, purely by internal combustion engine, purely by electric motor, or in mixed mode by both units 12, 16. For starting the internal combustion engine 12, it is also possible for the torque to flow in the opposite direction, i.e., from the electric machine 16 in direction of the internal combustion engine 12, depending on the actual configuration of the respective powertrain.

Figure 2:
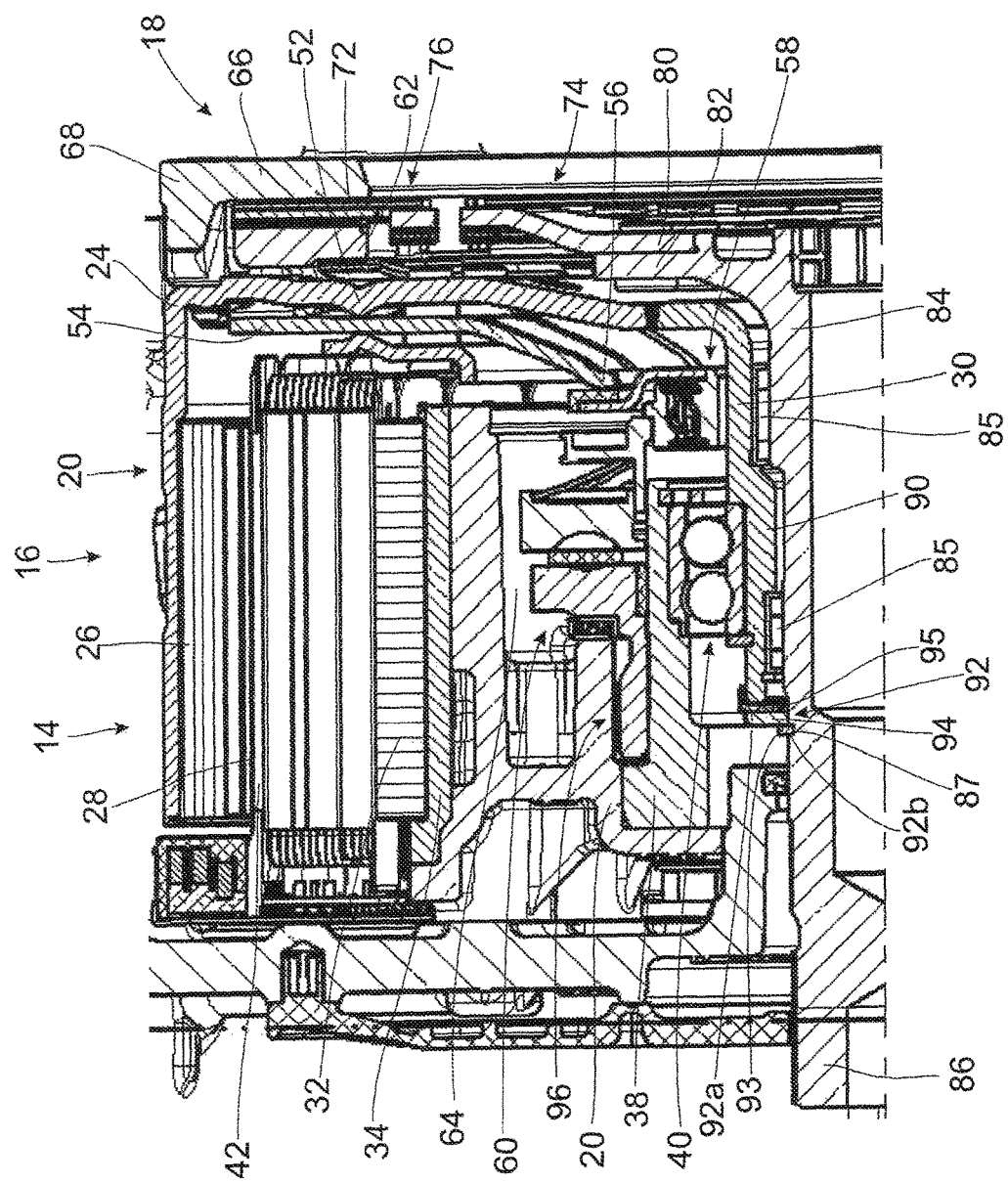
FIG. 2 a constructional variant of the drive module from FIG. 1.

FIG. 2 shows a constructional variant of a drive module 14 of this type. The foregoing statements referring to FIG. 1 can also be applied essentially to the drive module in FIG. 2. The reference numerals are used in FIG. 2 in a corresponding manner. The fastening of the drive module 14 to the housing of the internal combustion engine is not shown in this view. Further, the housing 20 and stator carrier 34 are formed by two different structural component parts.

An advantage in the use of an adjusting arrangement 92 of this type consists in the possibility of assembling the drive module 14 in its entirety before installing in the powertrain, since a corresponding axial alignment of the clutch disk arrangement 74, particularly the friction lining disk 72, already takes place during the preassembly of the drive module 14. This assembly is described exhaustively referring to FIG. 2.

When assembling the drive module 14, a preassembly including the rotor 22 with the rotor carrier 24, the friction clutch 18, the clutch disk arrangement 74 and the hub 84 is initially assembled. In this state, the clutch plate 66 and the rotor carrier 24 are tightly screwed together, so that the diaphragm spring 54 presses the pressure plate 62 and the friction lining disk 72 axially against the clutch plate 66. The friction clutch 18 is accordingly closed, and the clutch disk arrangement 74, particularly the friction lining disk 72 with its friction linings, contacts the clutch plate 66. The hub 84 is aligned radially relative to the rotor carrier 24, but so as to be axially freely movable, via the bearing arrangement 85 of needle bearings 85. The hub 84 is operatively connected to the friction lining disk 72 via the driver disk 80 and the axially elastic region 76 which is formed in this instance by a plurality of spring elements 76, particularly spring plates 76. The axially elastic region 76 is substantially free from axial forces.

In the state of this preassembly, a distance is determined between a first characteristic measurement point 92a of the supporting element 90 and a second characteristic measurement point 92b of the hub 84. The first characteristic measurement point 92a is formed by the axial end of the rotor shaft 30 of the rotor carrier 24. Further, it is possible that the thrust washer 95 is already arranged at the rotor shaft 30 and the thrust face thereof serves as first characteristic measurement point 92a. The groove 87 of hub 84, for example, can be utilized as second characteristic measurement point 92b. A thickness of the adjusting disk 94 is determined from this distance.

The adjusting arrangement 92 is subsequently assembled with the adjusting disk 94 of suitable thickness. A correct axial arrangement of hub 84 and clutch disk 72 at the friction clutch 18 is adjusted in this way. The rest of the structural component parts or elements of the drive module 14 are assembled subsequently.

In determining the distance between the characteristic measurement points 92a, 92b, the preassembly is advantageously supported at the clutch plate 66. Correspondingly, the preassembly advantageously contacts the driver disk 80 during the assembly of the adjusting arrangement 92 so that the axially elastic region 76 can allow an axial offset between the rotor carrier 24, particularly the rotor shaft 30, and the hub 84. After assembly of the adjusting arrangement 92, the axially elastic region 76 is under axial force or tension when the friction clutch 18 is closed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive module (14) for a powertrain (10) of a hybrid vehicle, comprising:
   a drive module housing (20) having at least a portion configured as a stator carrier (34);
   a friction clutch (18) comprising a pressure plate (62) and an actuating arrangement (60) configured to move said pressure plate (62) in an axial direction;
   a clutch plate (66);
   a clutch disk arrangement (74) positioned between said pressure plate (62) and said clutch plate (66);
   a hub (84) fixedly connected to said clutch disk arrangement (74);
   an electric machine (16) comprising a rotor (22) with a rotor carrier (24) and a stator (32) mounted at the stator carrier (34), wherein the electric motor is in axial arrangement with the hub;

a supporting element (90) axially fixed relative to said drive module housing (20), the supporting element (90) comprising at least a portion of the rotor carrier (24), wherein said supporting element (90) is formed integrally with said housing (20) of said drive module (14), with said stator carrier (34) or with said rotor carrier (24); and an adjusting arrangement (92) for determining an axial arrangement or alignment of the electric motor relative to the hub thereby determining an axial arrangement or alignment of said clutch disk arrangement (74) relative to said pressure plate (62) and said clutch plate (66), wherein said adjusting arrangement (92) is operatively disposed between said hub (84) and said supporting element (90).

2. The drive module (14) according to claim 1, wherein said adjusting arrangement (92) is arranged at an axial end region of said rotor carrier (24).

3. The drive module (14) according to claim 1, wherein said adjusting arrangement (92) comprises a first retaining element (93); an adjusting element (94) and a second retaining element (95).

4. The drive module (14) according to claim 3, wherein said second retaining element (95) forms a thrust washer (95) and is formed as a plastic part.

5. The drive module (14) according to claim 3, wherein said second retaining element (95) has a collar so as to be radially secured relative to said supporting element (90).

6. The drive module (14) according to claim 1, wherein the axial arrangement or alignment of said clutch disk arrangement (74) relative to said clutch plate (66) and said pressure plate (62) is fixed through a thickness of the adjusting arrangement (92).

7. The drive module (14) according to claim 1, wherein said hub (84) is supported relative to said supporting element (90) via a bearing arrangement (85).

8. A method of assembling a drive module (14), the drive module including a powertrain (10) of a hybrid vehicle, having: a drive module housing (20); a friction clutch (18) comprising a pressure plate (62) and an actuating arrangement (60) configured to move said pressure plate (62) in an axial direction; a clutch plate (66); a clutch disk arrangement (74) positioned between said pressure plate (62) and said clutch plate (66); a hub (84) fixedly connected to said clutch disk arrangement (74); an electric machine (16) comprising a rotor (22) with a rotor carrier (24) and a stator (32) mounted at a stator carrier (34); a supporting element (90) axially fixed relative to said drive module housing (20); and an adjusting arrangement (92) for determining an axial arrangement or alignment of said clutch disk arrangement (74) relative to said pressure plate (62) and said clutch plate (66), wherein said adjusting arrangement (92) is operatively disposed between said hub (84) and said supporting element (90), wherein the method of assembling the drive module comprises:

first assembling the rotor carrier (24), the friction clutch (18), the clutch disk arrangement (74) and the hub (84) to form a preassembly so that the friction clutch (18) is closed and the clutch disk arrangement (74) contacts the clutch plate (66);

subsequently determining a distance between a first characteristic measurement point (92a) of the supporting element and a second characteristic measurement point (92b) of the hub (84);

further determining a suitable thickness for an adjusting element (94) on the basis of the determined distance for correct arrangement or alignment of the clutch disk arrangement (74) at the friction clutch (18);

subsequently assembling the adjusting arrangement (92); and thereafter assembling remainder of component parts of the drive module (14).

* * * * *